United States Patent
Saito

(10) Patent No.: US 11,736,630 B2
(45) Date of Patent: Aug. 22, 2023

(54) SERVER FOR EMAIL PRINT AND SCAN FUNCTIONS, AND COMPUTER PROGRAM FOR SERVER

(71) Applicant: BROTHER KOGYO KABUSHIKI KAISHA, Nagoya (JP)

(72) Inventor: Ken Saito, Tokoname (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/673,967

(22) Filed: Feb. 17, 2022

(65) Prior Publication Data

US 2022/0263955 A1 Aug. 18, 2022

(30) Foreign Application Priority Data

Feb. 18, 2021 (JP) ................................. 2021-024517

(51) Int. Cl.
*H04N 1/00* (2006.01)
*H04N 1/32* (2006.01)

(52) U.S. Cl.
CPC ..... *H04N 1/00244* (2013.01); *H04N 1/00212* (2013.01); *H04N 1/32352* (2013.01)

(58) Field of Classification Search
CPC ................................................ H04N 1/00244
USPC ......................................................... 358/1.13
See application file for complete search history.

(56) References Cited

U.S. PATENT DOCUMENTS

| 2002/0091777 | A1* | 7/2002 | Schwartz | ............. G06Q 10/107 709/206 |
| 2009/0125599 | A1* | 5/2009 | Koide | ................ H04N 1/00212 709/206 |
| 2018/0114044 | A1* | 4/2018 | Moriyama | ........... G06K 7/1091 |
| 2022/0224802 | A1* | 7/2022 | Kim | ................... H04N 1/00244 |

FOREIGN PATENT DOCUMENTS

JP 2003-324577 A 11/2003

* cited by examiner

*Primary Examiner* — Jacky X Zheng
(74) *Attorney, Agent, or Firm* — Scully, Scott, Murphy & Presser, PC

(57) ABSTRACT

A server includes an email receiver, a memory controller, a first generator, and an email transmitter. The email receiver receives, from an external device, a first email including image data, a first email address, and a second email address. The memory controller stores identification information in association with the second email address. The first generator generates first print data representing a first print image. The first print image includes a first partial image represented by the image data and a second partial image representing an image corresponding to the identification information. The email transmitter transmits a second email including scanned data. The scanned data represents a scanned image. The second email further includes, as a destination address, the second email address associated with the identification information corresponding to the second partial image included in the scanned image.

15 Claims, 8 Drawing Sheets

FIG. 3 (FIRST EMBODIMENT)

FIG. 5
(SECOND EMBODIMENT)

| TERMINAL 200 | MFP 100A | SERVER 10 |
|---|---|---|

38

| DEVICE ID | EMAIL ADDRESS | SCAN FLAG |
|---|---|---|
| M1 | MA1 | YES |
| M1 | MA4 | NO |

(T210) MAILER ACTIVATION OPERATION (T212) DISPLAY EMAIL CREATION SCREEN SC1

SC1:
From: MA3
To: [ ]
Attached file: [ ]
[OK] [Cancel]

(T214) INPUT OF MA1 + SELECTION OF IMAGE DATA Imd1 + SELECTION OF OK (T220) EMAIL (SOURCE ADDRESS MA3, DESTINATION ADDRESS MA1, IMAGE DATA Imd1)

(T222) GENERATE AND STORE JOB ID "001"

(T224) GENERATE PRINT DATA PD1

40

| JOB ID | PRINT DATA | MFP ADDRESS | TERMINAL ADDRESS | REMAINING TIME | REMAINING NO. OF TIMES |
|---|---|---|---|---|---|
| 001 | PD1 | MA1 | MA3 | 1 HOUR | 3 |

(T230) PRINT DATA PD1

(T232) PRINT (PRINTED MATERIAL P1)

(T240) MAILER ACTIVATION OPERATION (T242) DISPLAY EMAIL CREATION SCREEN SC1

(T244) INPUT OF MA4 + SELECTION OF IMAGE DTA Imd2 + SELECTION OF OK (T250) EMAIL (SOUCE ADDRESS MA3, DESTINATION ADDRESS MA4, IMAGE DATA Imd2)

(T252) GENERATE AND STORE JOB ID "002"

(T254) GENERATE PRINT DATA PD2

(T260) PRINT DATA PD2

(T262) PRINT (PRINTED MATERIAL P2)

(A) (A) (A)

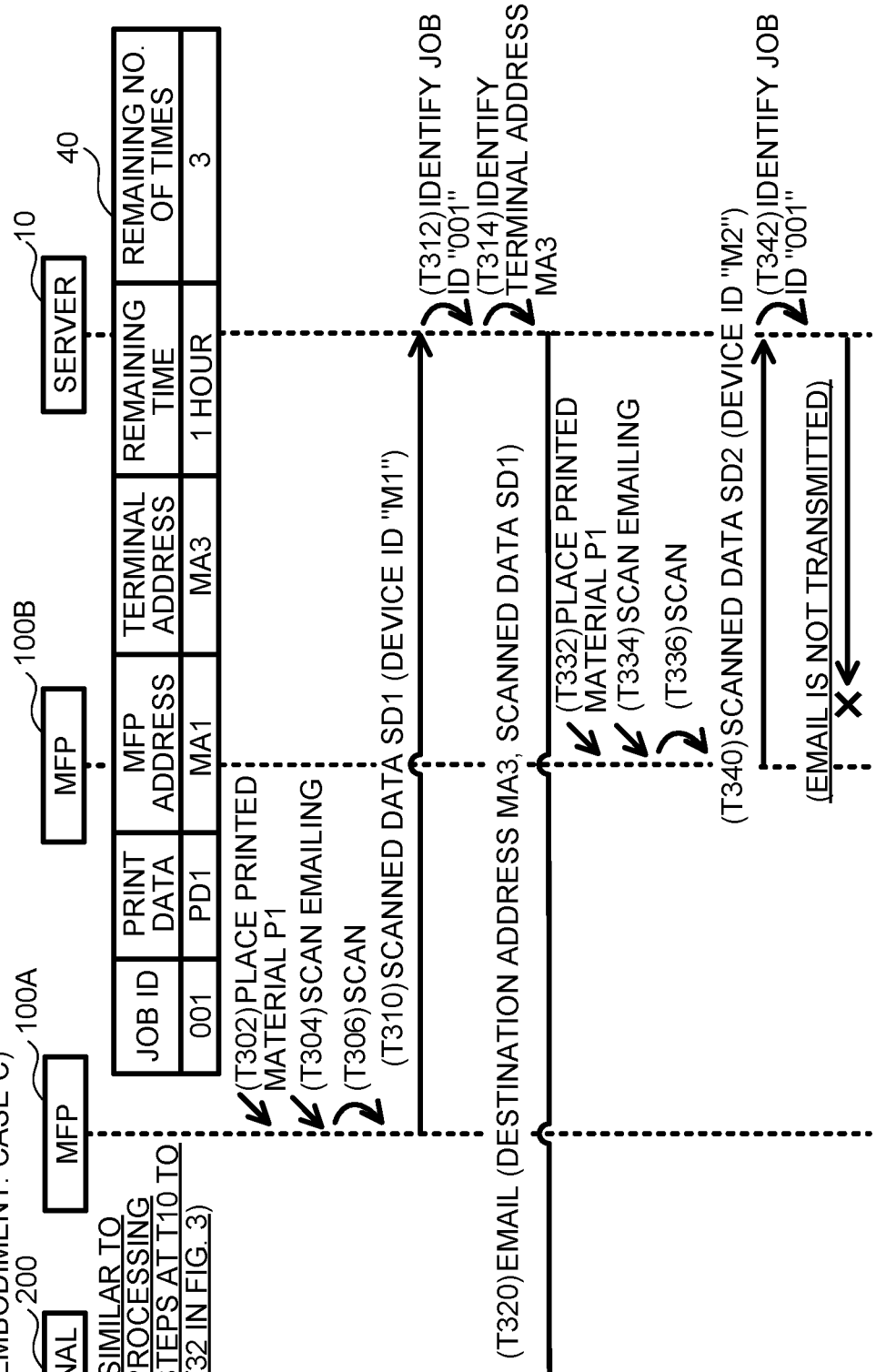

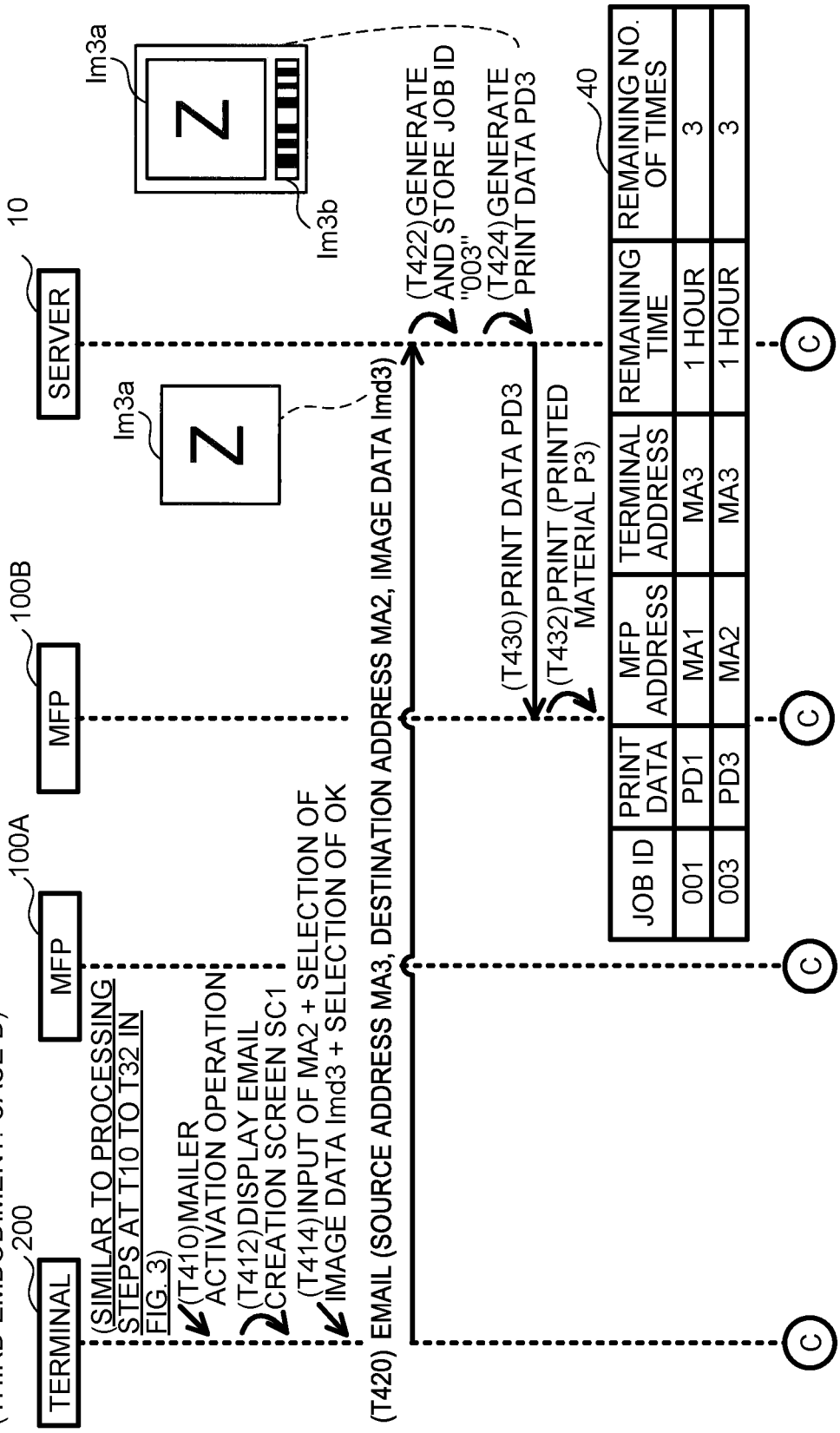

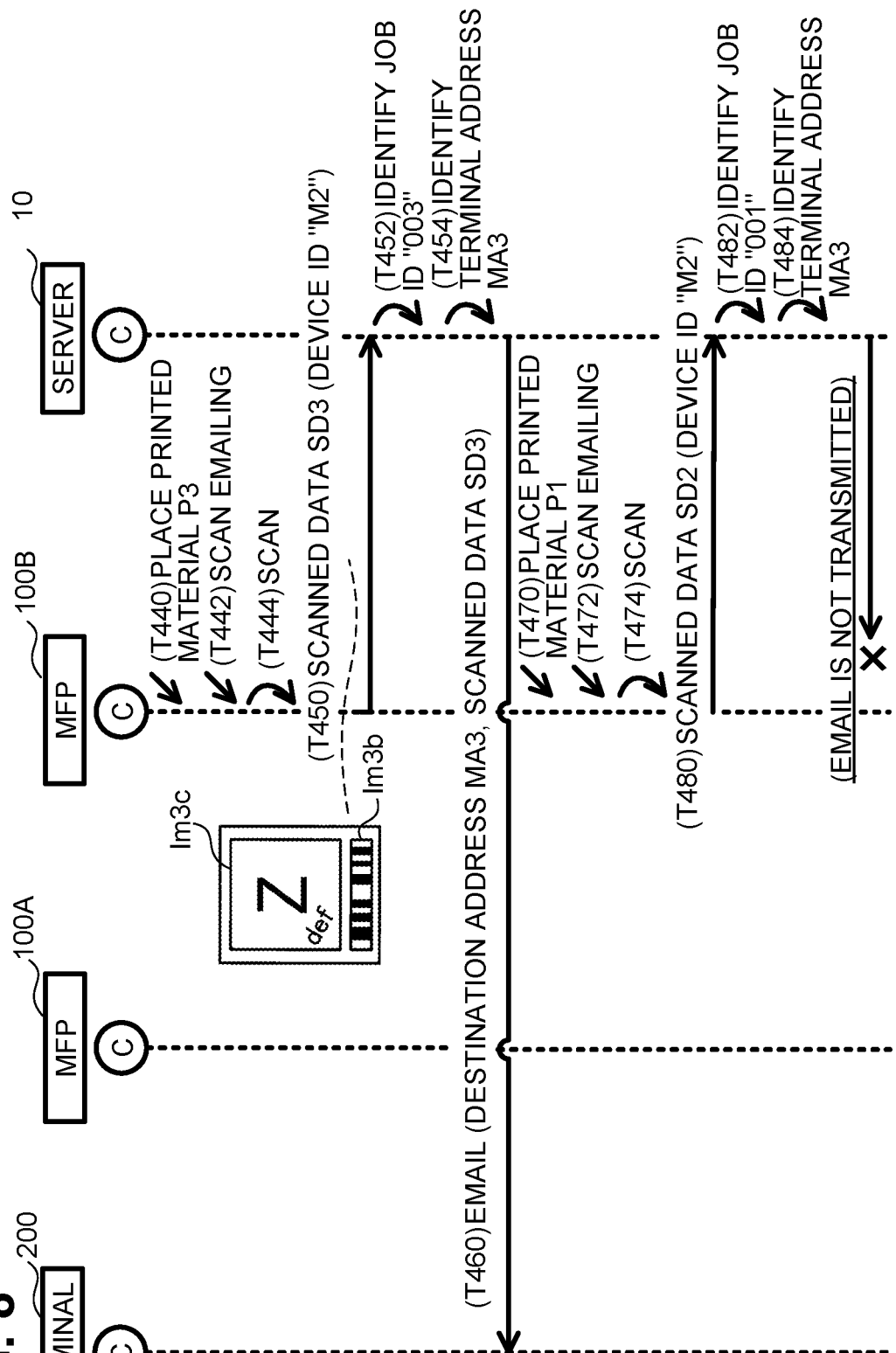

SERVER FOR EMAIL PRINT AND SCAN FUNCTIONS, AND COMPUTER PROGRAM FOR SERVER

CROSS-REFERENCE TO RELATED APPLICATION

This application claims priority from Japanese Patent Application No. 2021-024517 filed on Feb. 18, 2021, the content of which is incorporated herein by reference in its entirety.

TECHNICAL FIELD

This specification discloses a technique related to a server that enables email messages related to printing and scanning to be sent and received.

BACKGROUND

A known multifunction printer (MFP) receives an email accompanied with print data and extracts a sender's email address from the email. The MFP converts the email address into a barcode image and prints the barcode image over the print data. Then, the MFP scans a printed material including the barcode image, and transmits scanned data to an email address indicated by the barcode image.

SUMMARY

According to an aspect of the disclosure, a server includes memory, an email receiver, a memory controller, a first generator, a first print data transmitter, a scanned data receiver, and an email transmitter. The email receiver receives, from an external device, a first email including image data, a first email address as a destination address, and a second email address as a source address. The memory controller stores identification information in association with the second email address in the memory. The identification information identifies print data obtained using the image data included in the first email. The first generator generates first print data representing a first print image. The first print image includes a first partial image represented by the image data and a second partial image representing an image corresponding to the identification information. The first print data transmitter transmits the first print data to a printer corresponding to the first email address. The scanned data receiver receives scanned data from a scanner in response to the scanner scanning a printed material having the first print image output from the printer. The scanned data represents a scanned image including the first print image. The email transmitter transmits a second email including the scanned data. The second email further includes, as a destination address, the second email address associated with the identification information corresponding to the second partial image included in the scanned image.

According to another aspect of the disclosure, a non-transitory computer readable storage medium stores a program for a server including memory and a computer. The program includes instructions that, when executed, cause the computer to function as an email receiver, a memory controller, a first generator, a first print data transmitter, a scanned data receiver, and an email transmitter. The email receiver receives, from an external device, a first email including image data, a first email address as a destination address, and a second email address as a source address. The memory controller stores identification information in association with the second email address in the memory. The identification information identifies print data obtained using the image data included in the first email. The first generator generates first print data representing a first print image. The first print image includes a first partial image represented by the image data and a second partial image representing an image corresponding to the identification information. The first print data transmitter transmits the first print data to a printer corresponding to the first email address. The scanned data receiver receives scanned data from a scanner in response to the scanner scanning a printed material having the first print image output from the printer. The scanned data represents a scanned image including the first print image. The email transmitter transmits a second email including the scanned data. The second email further includes, as a destination address, the second email address associated with the identification information corresponding to the second partial image included in the scanned image.

BRIEF DESCRIPTION OF THE DRAWINGS

FIG. 5 is a sequence diagram of a specific case of a second embodiment.

FIG. 6 is a sequence diagram of a case C of a third embodiment.

FIG. 7 is a sequence diagram of a case D of a third embodiment.

FIG. 8 is a sequence diagram continued from FIG. 7.

DETAILED DESCRIPTION

This specification provides a technique for a server used to print based on a first email from an external device and transmit a second email including scanned data corresponding a print result to the external device.

First Embodiment

Figure 1:
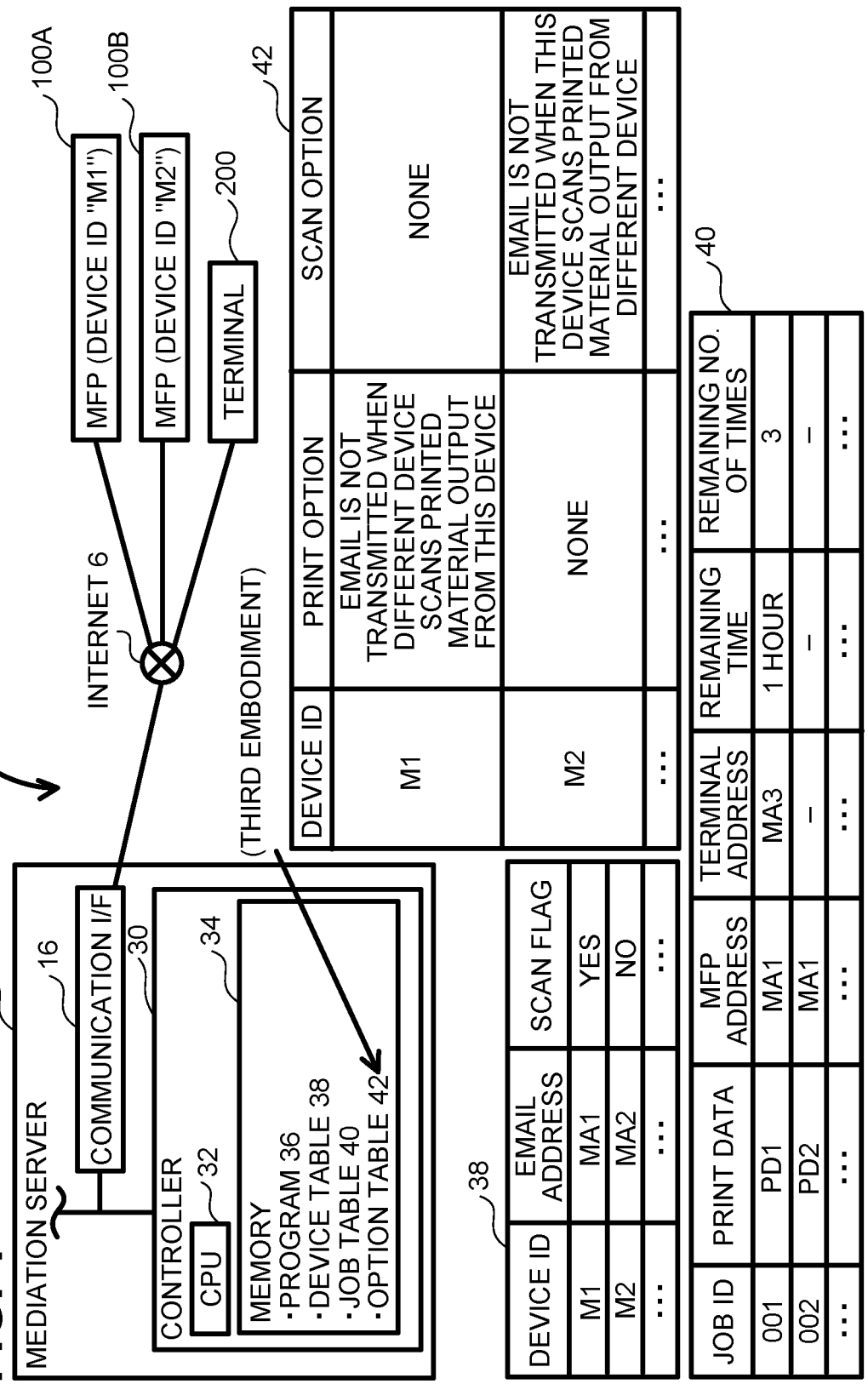
FIG. 1 is a configuration diagram of a communication system.

Configuration of Communication System: FIG. 1

As illustrated in FIG. 1, a communication system 2 includes a mediation server 10, a plurality of multifunction peripherals (MFPs) 100A and 100B, and a terminal 200. The devices 10, 100A, 100B, and 200 are connected to the Internet 6 and can communicate with each other via the Internet 6.

Configuration of Mediation Server 10

Hereinafter, the mediation server 10 will be abbreviated as "server 10". The server 10 communicates with an MFP (for example, a MFP 100A) for email printing and scan emailing Email printing is a function of allowing an MFP to print an image represented by image data attached to an email Scan emailing is a function of transmitting an email to which scanned data generated by the MFP is attached to an email address. The server 10 is installed on the Internet 6 by a vendor for the MFP 100A.

The server 10 includes a communication interface 16 and a controller 30. The communication interface 16 and the controller 30 are connected to a bus line. Hereinafter, an interface is abbreviated as an "I/F". The communication I/F 16 is connected to the Internet 6. The controller 30 includes a CPU 32 and memory 34. The CPU 32 performs various processing in accordance with a program 36 stored in the memory 34. The memory 34 includes a volatile memory and a nonvolatile memory. The memory 34 has a device table 38 and a job table 40.

The device table 38 is a table that stores records each having a device ID, an email address, and a scan flag. The device ID is information for identifying an MFP. The email address is an email address for allowing an MFP identified by the associated device ID to perform email printing. The scan flag is information indicating whether to attach a barcode to a medium to be printed by email printing. The scan flag indicates either "YES" with a barcode or "NO" without a barcode. The barcode is information obtained by encoding a job ID identifying a print job. As will be described in detail later, when a medium on which an image including a barcode has been printed is scanned by an MFP (for example, MFP 100A), the server 10 transmits an email including scanned data to a terminal address, as a destination address, which is associated with a job ID corresponding to the barcode.

The job table 40 is a table that stores records each having a job ID, print data, an MFP address, a terminal address, a remaining time, and a remaining number of times. The job ID is information for identifying a print job, and is generated when the server 10 receives an email including image data from a terminal (for example, the terminal 200). The print data is data generated by converting image data by the server 10. The print data has a format that can be interpreted by the MFP (e.g., 100A). In particular, print data corresponding to an email address (refer to the device table 38) associated with a scan flag indicating "YES" includes image data representing a barcode. On the other hand, print data corresponding to an email address associated with a scan flag indicating "NO" does not include image data representing a barcode.

The MFP address is a destination address of an email for email printing. The terminal address is a source address of an email for email printing. The terminal address is a destination address of an email for scan emailing. The remaining time is a remaining time during which an email including scanned data can be transmitted. The remaining number of times is a number of how many times an email including scanned data can be transmitted.

Configuration of MFPs 100A and 100B

The MFP 100A is a peripheral device (of, for example, the terminal 200) having a print function and a scan function. In some modifications, the MFP 100A may further have a fax function. The MFP 100A is assigned a device ID "M1" for identifying the MFP 100A. The MFP 100B is identical in configuration to the MFP 100A M2 except that the MFP 100B is assigned a device ID "M2".

Configuration of Terminal 200

The terminal 200 is a portable terminal device such as a mobile phone, a smartphone, a PDA, a notebook PC, or a tablet PC. In some modifications, the terminal 200 may be a stationary terminal device such as a desktop PC.

Figure 2:
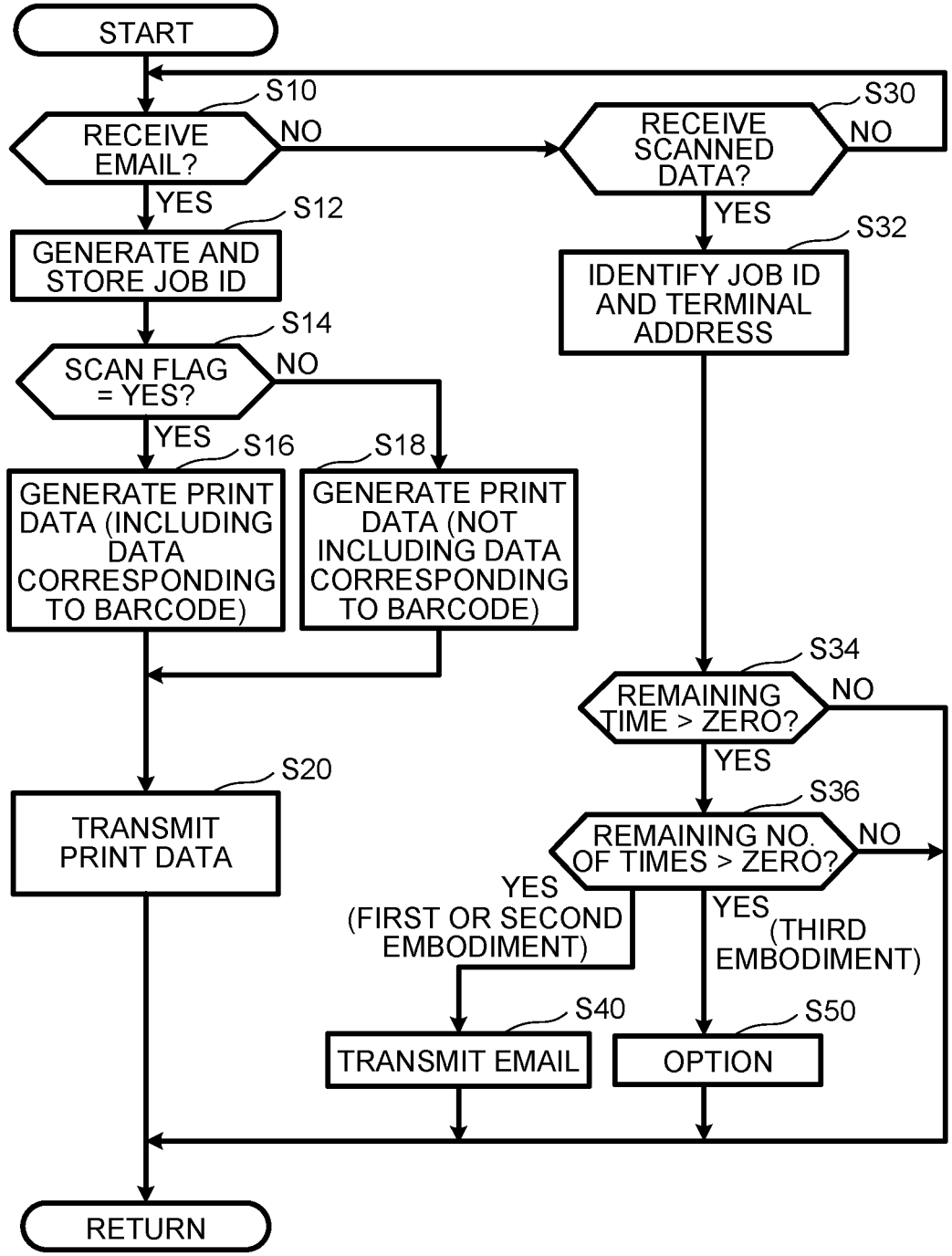
FIG. 2 is a flowchart of processing performed by a server.

Processing of Mediation Server: FIG. 2

Next, the processing performed by the CPU 32 of the server 10 will be described with reference to FIG. 2. The server 10 starts processing of FIG. 2 when its power is turned on.

In S10, the CPU 32 monitors reception of an email including image data that is an attached file, a destination address, and a source address. When receiving an email, the CPU 32 determines YES in S10 and the process proceeds to S12. Hereinafter, the image data, the destination address, and the source address, which are included in the email received at S10, are referred to as "target image data," a "target destination address," and a "target source address," respectively.

In S12, the CPU 32 updates the job table 40 (refer to FIG. 1). To be more specific, upon receiving an email, the CPU 32 generates a job ID (hereinafter referred to as a "target job ID"). Then, the CPU 32 stores the target job ID in the job table 40. The items other than the job ID in the job table 40 are blank as of this point in time.

In S14, the CPU 32 determines whether the scan flag associated with the target destination address indicates YES or NO using the device table 38. For example, the CPU 32 identifies the value of the scan flag associated with the target destination address from the device table 38. In a case where the value of the identified scan flag indicates "YES", the CPU 32 determines YES in S14 and the process proceeds to the S16. In a case where the value of the identified scan flag indicates "NO", the CPU 32 determines NO in S14 and the process proceeds to S18.

In S16, the CPU 32 generates print data including image data corresponding to the barcode. Specifically, the CPU 32 first converts the target image data to generate first print data having a format that can be interpreted by the MFP 100A, the MFP 100B, or the other device. Further, the CPU 32 generates second print data representing the barcode corresponding to the target job ID. Then, the CPU 32 generates print data including the generated first print data and the generated second print data. After that, the CPU 32 stores the print data, the target destination address, the target source address, the remaining time, and the remaining number of times in the job table 40 in association with the target job ID stored in S12. Here, values set in advance as the remaining time and the remaining number of times are stored.

In S18, the CPU 32 generates print data not including image data corresponding to the barcode. To be more specific, the CPU 32 converts the target image data to generate first print data. Then, the CPU 32 generates print data including the generated first print data and not including the above-described second print data. The CPU 32 stores the print data and the target destination address in the job table 40 in association with the target job ID stored in S12. In S18, the target source address, the remaining time, and the remaining number of times are not stored in association with the target job ID.

In S20, the CPU 32 transmits the print data generated in S16 or S18. For example, the CPU 32 identifies a target destination address associated with the target job ID from the job table 40. Next, the CPU 32 identifies a device ID associated with the target destination address from the device table 38. Then, the CPU 32 transmits the print data to a MFP identified by the identified device ID. Thus, the MFP prints an image represented by the print data on a medium.

Although detailed description is omitted, a so-called always-on connection is established between the server 10 and each MFP 100A, 100B. In S20, the server 10 transmits a notification indicating that the print data has been generated to the MFP using the always-on connection. Thereafter, in receiving a transmission request for print data from the MFP, the server 10 transmits the print data to the MFP.

In S30, the CPU 32 monitors reception of scanned data. The scanned data is obtained by scanning a printed material produced in accordance with the print data generated in S16. That is, a scanned image represented by the scanned data includes an image represented by the first print data and an image represented by the second print data (i.e., an image corresponding to the barcode). Hereinafter, the scanned data received here will be referred to as "target scanned data". When receiving the target scanned data, the CPU 32 determines YES in S30, and the process proceeds to S32.

In S32, the CPU 32 identifies a job ID and a terminal address by using the target scanned data. Specifically, the CPU 32 first identifies the job ID by decoding the barcode included in the scanned image represented by the target scanned data. Hereinafter, the job ID determined here is also described as a "target job ID". Then, the CPU 32 identifies the terminal address associated with the target job ID (that is, the source address of the target email received in S10) from the job table 40. Hereinafter, a terminal address determined in S32 is referred to as a "target terminal address".

In S34, the CPU 32 determines whether the remaining time is greater than zero. For example, the CPU 32 identifies a remaining time associated with the target job ID from the job table 40. When the identified remaining time is greater than zero, the CPU 32 determines YES in S34 and the processing of FIG. 2 proceeds to S36. When the identified remaining time is 0, the CPU 32 determines NO in S34 and the processing of FIG. 2 ends.

In S36, the CPU 32 determines whether the remaining number of times is greater than zero. For example, the CPU 32 identifies the remaining number of times associated with the target job ID from the job table 40. When the identified remaining number of times is greater than zero, the CPU 32 determines YES in S36 and the processing of FIG. 2 proceeds to S40. When the identified remaining number of times is 0, the CPU 32 determines NO in S36 and the processing of FIG. 2 ends.

In S40, the CPU 32 transmits an email containing the target scanned data. Specifically, the CPU 32 transmits an email containing the target scanned data received in S30 as an attached file and including the target terminal address identified in S32 as a destination address. The email is thus received by the terminal of the transmission source included in the email received in S10. When a step in S40 ends, the processing of FIG. 2 ends.

Figure 3:
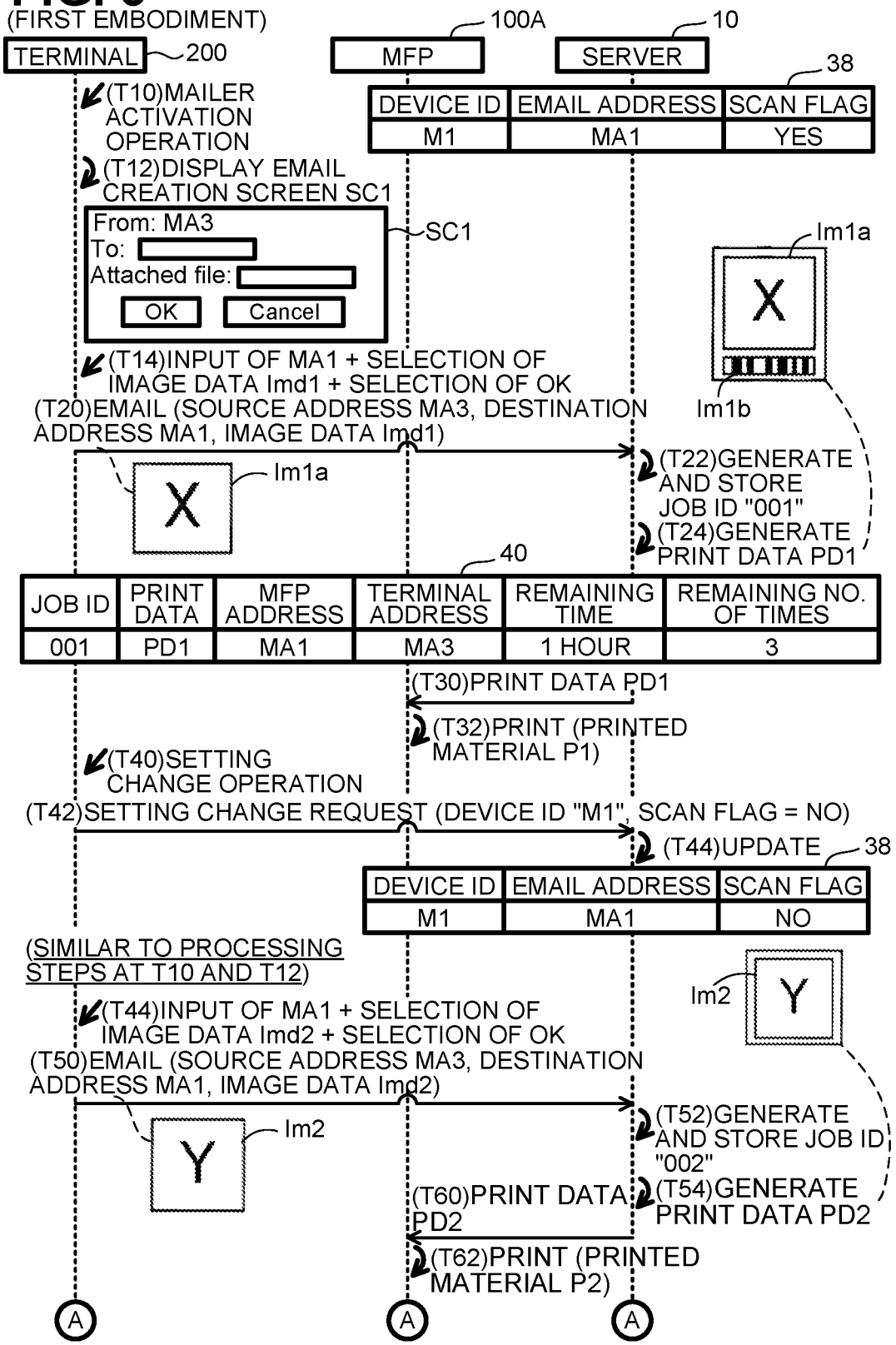
FIG. 3 is a sequence diagram of a specific case of a first embodiment.

Specific Case: FIG. 3

Next, a specific case realized by the processing of FIG. 2 will be described with reference to FIG. 3. Although not illustrated, in the initial state in FIG. 3, an XMPP (abbreviation of Extensible Messaging and Presence Protocol) connection, which is a so-called always-on connection, is established between the MFP 100A and the server 10. The use of the XMPP connection enables the server 10 to transmit a signal (for example, a notification indicating that the print job has been generated) to the MFP 100A over the firewall of the LAN to which the MFP 100A belongs without receiving a request from the MFP 100A. In the initial state in FIG. 3, the server 10 stores the device ID "M1", the email address "MA1", and the scan flag "YES" in association with one another in the device table 38. The user of the terminal 200 has already obtained the email address MA1 for allowing the MFP 100A to perform email printing.

In the following description, an operation performed by a CPU of each device (for example, the CPU 32) is described as an operation performed by a device (for example, the server 10) for ease of understanding. In addition, the server 10 performs all communications via a communication I/F 16. Therefore, the phrase "via communication I/F 16" will be omitted below.

At T10 of FIG. 3, the terminal 200 receives a mailer activation operation for activating a mailer (not shown) from the user. Upon receiving the mailer activation operation from the user, the terminal 200 displays an email creation screen SC1 at T12. The email creation screen SC1 includes an email address MA3 of the terminal 200 as a source address (i.e., "From"), an input field for a destination address (i.e., "To"), a selection field for an attached file, an OK button, and a cancel button.

At T14, the terminal 200 receives an input of an email address MA1 as a destination address, and a selection of an image data Imd1 as an attached file, and then receives a selection of the OK button. In this case, the terminal 200 transmits an email to the server 10 at T20. The email includes the source address MA3 on the email creation screen SC1, the destination address MA1 input at T14, and the image data Imd1 selected at T14. The image data Imd1 represents an image Im1a to be printed.

When the server 10 receives the email from the terminal 200 at T20 (YES in S10 in FIG. 2), the server 10 at T22 generates a job ID "001" and stores the job ID "001" in the job table 40 (S12).

Next, the server 10 identifies, from the device table 38, the destination address MA1 included in the email received at T20 and the scan flag "YES" associated with the email address MA1. In this case, since the scan flag "YES" is associated with the email address MA1 (YES in S14), the server 10 generates print data PD1 at T24 (S16). The print date PD1 includes first print data representing an image Im1a and second print data representing a barcode Im1b obtained by encoding the job ID "001". In association with the job ID "001", the server 10 stores the print data PD1, the destination address MA1 included in the email received at T20, the source address MA3 included in the email received at T20, the remaining time "1 hour", and the remaining number of times "3". The remaining time "1 hour" is an example, and the remaining time may be less than one hour or may be one hour or more. Further, the remaining number of times "3" is an example. The remaining number of times may be less than three times or may be three times or more.

Thereafter, at T30, the server 10 transmits the print data PD1 to the MFP 100A corresponding to the destination address MA1 (S20 in FIG. 2). Here, although not illustrated, the server 10 transmits a notification indicating that the print data PD1 has been generated to the MFP 100A by using the XMPP connection (not illustrated) established between the MFP 100A and the server 10. Thereafter, in receiving a transmission request for the print data PD1 from the MFP 100A, the server 10 transmits the print data PD1 to the MFP 100A.

When receiving the print data PD1 from the server 10 at T30, the MFP 100A prints an image represented by the print data PD1 on a medium at T32. Thus, a printed material P1 is obtained. The printed material P1 includes an image Im1a and a barcode Im1b. For the printed material P1 having a plurality of pages, the barcode Im1b may be printed only on a first page of the printed material P1 or on all pages of the printed material P1.

Thereafter, at T40, the terminal 200 receives a setting change operation for changing the scan flag associated with the device ID "M1" in the device table 38. The setting change operation includes an operation for selecting the device ID "M1" of the MFP 100A as a target for setting changes and an operation for changing the scan flag to "NO". The terminal 200 then transmits a setting change request to the server 10 at T42. The setting change request includes the device ID "M1" and the scan flag "NO".

When receiving the setting change request at T42, the server 10 updates the device table 38 at T44. For example, the server 10 changes the scan flag associated with the device ID "M1" included in the setting change request from "YES" to "NO".

Thereafter, a sequence of processing steps similar to those at T10 and T12 is performed. At T44, the terminal 200 receives an input of the email address MA1 as a destination address, and a selection of the image data Imd2 as an attached file, and then receives a selection of the OK button. The terminal 200 then transmits an email to the server 10 at T50. The email includes the source address MA3 on the email creation screen SC1, the destination address MA1 input at T44, and the image data Imd2 selected at T44. The image data Imd2 represents an image Im2 to be printed.

When the server 10 receives the email from the terminal 200 at T50 (YES in S10 in FIG. 2), the server 10 at T52 generates a job ID "002" and stores the job ID "002" in the job table 40 (S12).

Next, the server 10 identifies, from the device table 38, the destination address MA1 included in the email received at T50 and the scan flag "NO" associated with the email address MA1. In this case, since the scan flag "NO" is associated with the email address MA1 (NO in S14), the server 10 generates print data PD2 at T54 (S18). The print date PD2 includes first print data representing an image Im2 and second print data representing a barcode obtained by encoding the job ID "002". In association with the job ID "002", the server 10 stores the print data PD2 and the destination address MA1 included in the email received at T50. In this case, the terminal address, the remaining time, and the remaining number of times are not stored in association with the job ID "002" (refer to the job table 40 in FIG. 1). A processing step at T60 is similar to that at T30 except that the print data PD2 is transmitted and received, and a processing step at T62 is similar to those at T32 except that a printed material P2 is produced.

As described above, when the scan flag "YES" is stored in association with the email address MA1 in the device table 38, the server 10 generates the print data PD1 including the second print data representing the barcode (at T24). In contrast, when the scan flag "NO" is stored in association with the email address MA1 in the device table 38, the server 10 generates the print data PD2 not including print data representing a barcode (at T54). In particular, the scan flag stored in association with the email address MA1 can be set by the user (refer to T40 to T44). Therefore, the server 10 can switch between printing with a barcode and printing without a barcode in response to the user's intention.

Figure 4:
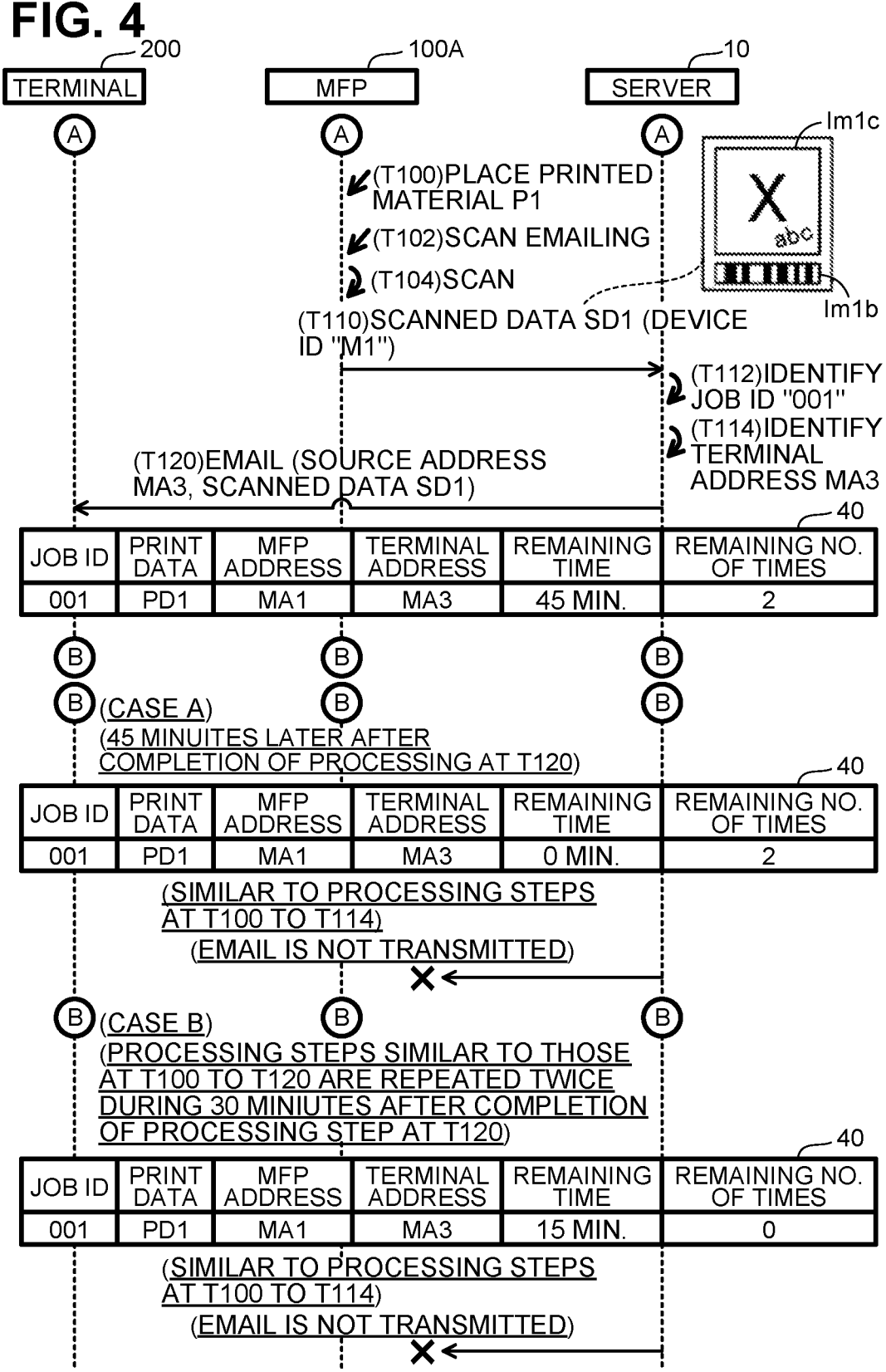
FIG. 4 is a sequence diagram continued from FIG. 3.

FIG. 4 continued from FIG. 3

The processing of FIG. 4 is performed 15 minutes after the job ID "001" is stored in the job table 40 at T22 of FIG. 3. At T100 of FIG. 4, the user handwrites the characters "abc" on the printed material P1 generated at T32 of FIG. 3, and then places the printed material P1 on a scanning table of the MFP 100A. After that, the MFP 100A receives a scan emailing operation from the user at T102, and scans the printed material P1 to generate scanned data SD1 at T104. At T110, the MFP 100A transmits the scanned data SD1 generated at T104 and the device ID "M1" of the MFP 100A to the server 10.

The server 10 receives the scanned data SD1 at T110 (YES in S30 in FIG. 2), and identifies the job ID "001" at T112 by decoding the barcode Im1b included in the scanned image represented by the scanned data SD1 (S32). At T114, the server 10 identifies the terminal address MA3 associated with the job ID "001" from the job table 40 (S32). The server 10 further identifies the remaining time "45 minutes" and the remaining number of times "3" that are associated with the job ID "001" from the job table 40, and determines that each of the remaining time and the remaining number of times is greater than zero (YES in S34 and YES in S36). At T120, the server 10 transmits an email including the scanned data SD1 received at T110 and the terminal address MA3 identified at T114 as a destination address to the terminal 200 corresponding to the terminal address MA3 (S40).

At T120, the terminal 200 receives the email including the scanned data SD1 from the server 10. This enables the user of the terminal 200 to view the scanned image including the handwritten characters "abc".

At T120, the server 10 transmits an email including the scanned data SD1 and changes the remaining number of times associated with the job ID "001" to "two times" (not illustrated).

Case A: FIG. 4

Next, a case A occurring 45 minutes later after the completion of the processing at T120 will be described. In this case, the remaining time associated with the job ID "001" in the job table 40 is 0 minutes. Under such a situation, a sequence of processing steps similar to those at T100 to T114 is performed. In this case, the server 10 determines that the remaining time associated with the job ID "001" is "0 minutes" (NO in S34 of FIG. 2), and thus does not transmit an email including the scanned data SD1. The server 10 does not transmit an email including the scanned data when the server 10 receives scanned data after a lapse of a predetermined time (one hour in this case) since the job ID "001" was stored. For this reason, an expiration of time during which scan emailing is feasible can be set. In some embodiments, when the remaining time associated with the job ID "001" is "0 minutes", the server 10 may delete the job ID "001" from the job table 40. In this case, even if the server 10 receives scanned data from the MFP 100A, the server 10 does not transmit an email including the scanned data to the terminal 200 in response to a determination that the job table 40 does not have a job ID identifiable from the scanned data.

Case B: FIG. 4

Next, a case B will be described in which a sequence of processing steps similar to those at T100 to T120 is repeated twice while 30 minutes elapses after the processing step at T120 is performed. In this case, the remaining time and the remaining number of times that are associated with the job ID "001" in the job table 40 are "15 minutes" and "0 times", respectively. Under such a situation, a sequence of processing steps similar to those at T100 to T114 is performed. In this case, the server 10 determines that the remaining time and the remaining number of times that are associated with the job ID "001" is "15 minutes" (YES in S34 of FIG. 2) and "0 times" (NO in S36 in FIG. 2), and thus does not transmit an email including the scanned data SD1. When the server 10 receives scanned data again after receiving the scanned data a predetermined number of times (three times in this case) since the job ID "001" was stored, the server 10 does not transmit an email including the scanned data. For this reason, the number of times that scan emailing is feasible can be set. In some embodiments, when the remaining number of times associated with the job ID "001" is "0 times", the server 10 may delete the job ID "001" from the job table 40. In this case, even if the server 10 receives scanned data from the MFP 100A, the server 10 does not transmit an email including the scanned data to the terminal 200 in response to a determination that the job table 40 does not have a job ID identifiable from the scanned data.

Effects of First Embodiment

According to this embodiment, the server 10 stores the job ID "001" and the terminal address MA3 in association with each other (at T24 in FIG. 3). For this reason, the server 10 can transmit an email including the terminal address MA3, as a transmission destination address, which is stored in association with the job ID "001" corresponding to the barcode Im1b included in the scanned image represented by the scan data SD1 (at T120 in FIG. 4). As described above, in this embodiment, the server 10 can be used to perform printing based on an email from the terminal 200 (refer to T20 in FIG. 3) and transmitting, to the terminal 200, an email including scanned data that corresponds to a printed material P1 obtained by printing (refer to T120 in FIG. 4).

In particular, in this embodiment, a barcode is an image in which a job ID is encoded. The job ID is an ID for identifying the print data and does not include the source address of the email at T20 in FIG. 3. Therefore, the source address is not obtained by a third party who would obtain the image including the barcode without permission. This prevents the source address from leaking out.

Correspondence Relationship

The mediation server 10 is an example of a server, the MFP 100A is an example of a printer (and a scanner), and the terminal 200 is an example of an external device. The image data Imd1 is an example of image data, the email address MA1 is an example of a first email address, and the email address MA3 is an example of a second email address. The email transmitted at T20 of FIG. 3 is an example of a first email, and the email transmitted at T120 of FIG. 4 is an example of a second email. The image Im1a is an example of a first image, and the barcode Im1b is an example of a second image. The print data PD1 is an example of first print data, and the print data PD2 is an example of second print data. An image including the image Im1a and the barcode Im1b is an example of a first print image, and an image including the image Im2 is an example of a second print image. The image Im1a is an example of a first partial image, and the barcode Im1b is an example of a second partial image. "1 hour" is an example of a predetermined time, and "3 times" is an example of a predetermined number of times. The scan flag "YES" is an example of flag information. The determination that the scan flag indicates "YES" is an example in which the "predetermined condition" is satisfied.

In FIG. 2, the processing in S10 is an example of processing performed by an email receiver, the processing in S12 is an example of processing performed by a memory controller, and the processing in S14 is an example of processing performed by a determiner. The processing in S16 is an example of processing performed by a first generator, the processing in S18 is an example of processing performed by a second generator. The processing in S20 is an example of processing performed by first or second print data transmitter, the processing in S30 is an example of processing performed by scanned data receiver, and the processing in S40 is an example of processing performed by an email transmitter.

Second Embodiment: FIG. 5

Next, a second embodiment will be described with reference to FIG. 5. In the second embodiment, the MFP 100A has two email addresses MA1 and MA4 to perform email printing. The email address MA1 is an email address used when the user desires the MFP 100A to print an image including a barcode. The email address MA4 is an email address used when the user desires the MFP 100A to print an image without a barcode. In the initial state in FIG. 5, the server 10 stores a record containing the device ID "M1", the email address "MA1", and the scan flag "YES" in association with one another, and another record containing the device ID "MA1", the email address "MA4", and the scan flag "NO" in association with one another. The user of the terminal 200 has already obtained the email addresses MA1 and MA4 for allowing the MFP 100A to perform email printing.

A sequence of processing steps at T210 to T232 in FIG. 5 is similar to those at T10 to T32 in FIG. 3. A sequence of processing steps at T240 and T242 is similar to those at T10 and T12 in FIG. 3.

At T244, the terminal 200 receives an input of an email address MA4 as a destination address, and a selection of an image data Imd2 as an attached file, and then receives a selection of the OK button. A sequence of processing steps at T250 to T262 is similar to those at T50 to T62 in FIG. 3.

In this embodiment, when the server 10 receives an email including the email address MA1 stored in association with a scan flag "YES" (at T220), the server 10 generates print data PD1 including second print data representing a barcode (at T224). In this embodiment, when the server 10 receives an email including the email address MA4 stored in association with a scan flag "NO" (at T250), the server 10 generates print data PD2 without print data representing a barcode (at T254). The user can thus select whether to print a bar code by selecting a destination email address. That is, the server 10 can switch between printing with a barcode and printing without a barcode in response to the user's intention. In this embodiment, the email address MA1 is an example of a first type email address, and the email address MA4 is an example of a second type email address.

Third Embodiment

Next, a third embodiment will be described. In the third embodiment, the memory 34 of the server 10 further stores an option table 42 (refer to FIG. 1).

As illustrated in FIG. 1, the option table 42 is a table that stores a device ID, a print option, and a scan option in association with one another. The print option and the scan option are information used when scan emailing is performed. The print option and the scan option are set by the user.

In this embodiment, the device ID "M1" is stored in association with a print option that is "an email is not transmitted when a different device scans a printed material output from this device". In this case, "this device" refers to a device identified by the device ID "M1" (i.e., the MFP 100A), and the "different device" refers to a device different from the device identified by the device ID "M1" (i.e., the MFP 100B). That is, in a case where an image including a barcode is printed on the MFP 100A ("this device") and then the image is scanned on the MFP 100B ("different device"), the server 10 does not transmit an email including scanned data.

In this embodiment, the device ID "M2" is stored in association with a print option that is "an email is not transmitted when this device scans a printed material output from a different device". In this case, "this device" refers to a device identified by the device ID "M2" (i.e., the MFP 100B), and the "different device" refers to a device different from the device identified by the device ID "M2" (i.e., the MFP 100A). That is, in a case where an image including a barcode is printed on the MFP 100A ("different device") and then the image is scanned on the MFP 100B ("this device"), the server 10 does not transmit an email including scanned data.

Processing of Server: FIG. 2

As illustrated in FIG. 2, in the third embodiment, the CPU 32 of the server 10 performs option processing in S50 in response to determining YES in S36. The option processing is a process of determining whether to transmit an email including scanned data in accordance with the option table 42. Details of the option processing will be described later.

Case C of Third Embodiment: FIG. 6

Next, a specific case C realized by the processing of FIG. 2 will be described with reference to FIG. 6. Case C is a case where after an image including a barcode is printed on the MFP 100A, the image is scanned on each of the MFP 100A and the MFP 100B. In the initial state of FIG. 6, contents stored in the option table 42 are as shown in FIG. 1.

In FIG. 6, a sequence of processing steps similar to those at T10 to T32 in FIG. 3 is performed. As a result, an image including a barcode is printed on the MFP 100A and output therefrom as a printed material P1 (refer to T32 in FIG. 3). A sequence of processing steps at T300 to T314 is similar to those at T100 to T114 in FIG. 4.

Thereafter, the server 10 performs the option processing (in S50 in FIG. 2). Specifically, the server 10 identifies an MFP address MA1 associated with the job ID "001" identified from the job table 40. Next, the server 10 identifies a device ID "M1" associated with the MFP address MA1 identified from the device table 38. The server 10 further identifies a print option and a scan option that are associated with the device ID "M1" identified from the option table 42. The server 10 further identifies a print option and a scan option that are associated with a device ID "M1" received at T310.

After that, to set the print option associated with the device ID "M1" to "an email is not transmitted when a different device scans a printed material output from this device," the server 10 determines whether a device from which a printed material was output coincides with a device on which the printed material was scanned. In this case, the server 10 determines whether a device from which the printed material P1 was output coincides with a device on which the printed material P1 was scanned (i.e., a source device for the scanned data SD1). Specifically, the server 10 determines whether the device ID "M1" identified from the job ID "001" coincides with the device ID "M1" received at T310. In this case, the server 10 determines that they coincide with each other. That is, the server 10 determines that the device from which the printed material was output coincides with the device on which the printed material was scanned. At T320, the server 10 transmits an email including the scanned data SD1 received at T310 and the terminal address MA3 identified at T314 as a destination address to the terminal 200 corresponding to the terminal address MA3.

A sequence of processing steps at T332 to T342 is similar to those at T100 to T112 in FIG. 4 except that the device that scans the printed material P1 is the MFP 100B. Thereafter, the server 10 performs the option processing (in S50 in FIG. 2). Specifically, the server 10 identifies the device ID "M1" from the identified job ID "001", and identifies a print option and a scan option that are associated with the device ID "M1". The server 10 further identifies a print option and a scan option associated with a device ID "M2" received at T340.

After that, to set the print option associated with the device ID "M1" to "an email is not transmitted when a different device scans a printed material output from this device" and set the scan option associated with the device ID "M2" to "an email is not transmitted when this device scans a printed material output from a different device," the server 10 determines whether a device from which a printed material was output coincides with a device on which the printed material was scanned. In this case, the server 10 determines whether a device from which the printed material P1 was output coincides with a device on which the printed material P1 was scanned (i.e., a source device for the scanned data SD2). Specifically, the server 10 determines whether the device ID "M1" identified from the job ID "001" coincides with the device ID "M2" received at T340. In this case, the server 10 determines that they do not coincide with each other. That is, the server 10 determines that the device from which the printed material was output does not coincide with the device on which the printed material was scanned. Thus, the server 10 does not transmit an email including the scanned data SD2.

Although not illustrated, in a situation where the above-described print option is not stored in association with the device ID "M1", the server 10 transmits an email including scanned data to the terminal 200 regardless of whether the printed material P1 is scanned on the MFP 100A or the MFP 100B.

Here, as a comparative example, an assumption is made that the server 10 does not store the above-described print option. In this comparative example, for example, when a third party obtains and scans a printed material P1 without permission, scanned data is transmitted to the terminal 200 that has allowed the MFP 100A to perform printing. That is, the terminal 200 may receive unnecessary data. In this embodiment, the server 10 stores the above-described print option, thus preventing the terminal 200 from receiving scanned data when the printed material P1 is scanned by a device different from the MFP 100A. In this modification, the MFP 100A is an example of a first multifunction peripheral, the MFP 100B is an example of a different scanner other than the first multifunction peripheral, and the device ID "M1" is an example of first device identification information. The print option that is "an email is not transmitted when a different device scans a printed material output from this device" is an example of first option information.

Case D of Third Embodiment (FIGS. 7 and 8)

Next, a case D realized by the processing of FIG. 2 will be described with reference to FIGS. 7 and 8. Case D is a case where, after an image including a barcode is printed on each of the MFP 100A and the MFP 100B, the image is scanned on the MFP 100B. In the initial state of FIG. 7, contents stored in the option table 42 are as shown in FIG. 1.

In FIG. 7, a sequence of processing steps similar to those at T10 to T32 in FIG. 3 is performed. As a result, an image including a barcode is printed on the MFP 100A and output therefrom as a printed material P1 (refer to T32 in FIG. 3). A sequence of processing steps at T410 to T420 is similar to those at T10 to T20 in FIG. 3 except that an email address to be input is MA2 and an image to be selected is Imd3. Further, a sequence of processing steps at T422 to T432 is similar to those at T22 to T32 in FIG. 3 except that a job ID "003" and print data PD3 are generated, the print data PD3 is transmitted to the MFP 100B, and a printed material P3 is produced.

FIG. 8 continued from FIG. 7

In FIG. 8, a sequence of processing steps at T440 to T454 is similar to those at T100 to T114 in FIG. 4 except that the printed material P3 is scanned and a device that scans the printed material P3 is the MFP 100B.

Thereafter, the server 10 performs the option processing (in S50 in FIG. 2). Specifically, the server 10 identifies an MFP address MA2 associated with the job ID "003" identified from the job table 40. Next, the server 10 identifies a device ID "M2" associated with the MFP address MA2 identified from the device table 38. The server 10 further identifies a print option and a scan option that are associated with the device ID "M2" identified from the option table 42. The server 10 further identifies a print option and a scan option that are associated with a device ID "M2" received at T450.

After that, to set the scan option associated with the device ID "M2" to "an email is not transmitted when this device scans a printed material output from a different device," the server 10 determines whether a device from which a printed material was output coincides with a device on which the printed material was scanned. In this case, the server 10 determines whether a device from which the printed material P3 was output coincides with a device on which the printed material P3 was scanned (i.e., a source device for the scanned data SD3). Specifically, the server 10 determines whether the device ID "M2" identified from the job ID "003" coincides with the device ID "M2" received at T450. In this case, the server 10 determines that they coincide with each other. That is, the server 10 determines that the device from which the printed material was output coincides with the device on which the printed material was scanned. At T460, the server 10 transmits an email including the scanned data SD3 received at T450 and the terminal address MA3 identified at T454 as a destination address to the terminal 200 corresponding to the terminal address MA3.

A sequence of processing steps at T470 to T484 is similar to those at T100 to T114 in FIG. 4 except that the device that scans the printed material P1 is the MFP 100B. Thereafter, the server 10 performs the option processing (in S50 in FIG. 2). Specifically, the server 10 identifies the device ID "M1" from the identified job ID "001", and identifies a print option and a scan option that are associated with the device ID "M1". The server 10 further identifies a print option and a scan option that are associated with a device ID "M2" received at T480.

After that, to set the print option associated with the device ID "M1" to "an email is not transmitted when a different device scans a printed material output from this device" and set the scan option associated with the device ID "M2" to "an email is not transmitted when this device scans a printed material output from a different device," the server 10 determines whether a device from which a printed material was output coincides with a device on which the printed material was scanned. In this case, the server 10 determines whether a device from which the printed material P1 was output coincides with a device on which the printed material P1 was scanned (i.e., a source device for the scanned data SD2). Specifically, the server 10 determines whether the device ID "M1" identified from the job ID "001" coincides with the device ID "M2" received at T480. In this case, the server 10 determines that they do not coincide with each other. That is, the server 10 determines that the device from which the printed material was output does not coincide with the device on which the printed material was scanned. Thus, the server 10 does not transmit an email including the scanned data SD2.

Although not illustrated, in a situation where the above-described scan option is not stored in association with the device ID "M2", the server 10 transmits an email including scan data to the terminal 200 regardless of whether the printed material P1 output from the MFP 100A or the printed material P3 output from the MFP 100B is scanned on the MFP 100B.

Here, as a comparative example, an assumption is made that the server 10 does not store the above-described scan option. In this comparative example, for example, when a third party obtains a printed matter P1 without permission, the third party uses the MFP 100B to scan the printed material P1 together with a printed material with a barcode for the third party to transmit scanned data to their own terminal. In this case, scanned data of the printed material P1 can be transmitted to the third party's terminal. In this embodiment, however, the server 10 stores the above scan option. Even if a printed material including a barcode to transmit scanned data to the third party's terminal is scanned on the MFP 100B, scanned data is not transmitted to the third party's terminal. In this embodiment, the MFP 100A is an example of a printer different from a second multifunction peripheral, the MFP 100B is an example of a second multifunction peripheral, and the device ID "M2" is an example of second device identification information. The scan option that is "an email is not transmitted when this device scans a printed material output from a different device" is an example of second option information.

Although specific examples of the technology disclosed in this specification have been described in detail above, these are merely examples and do not limit the scope of the claims. The technology described in the claims includes various modifications and changes of the specific examples illustrated above. Modifications of the above embodiment are enumerated below.

In a first modification, a "second partial image" is not limited to a barcode, and may include, for example, a QR Code (a registered trademark of DENSO WAVE Incorporated in Japan), and a character string representing a job ID. In particular, when the "second partial image" is a character string representing a job ID, the server 10 may identify the job ID by recognizing the character string representing the job ID included in the scanned image with an optical character recognition (OCR).

In a second modification, the server 10 may not store the remaining time in association with the job ID in the job table 40. Generally speaking, when the "server" receives scanned data from the scanner even after the expiration of a predetermined time since the identification information and the second email address were stored in the memory, the server may transmit the second email.

In a third modification, the server 10 may not store the remaining number of times in association with the job ID in the job table 40. Generally speaking, when the "server" receives scanned data again after receiving the scanned data from the scanner a predetermined number of times since the identification information and the second mail address were stored in the memory, the server may transmit the second email.

In a fourth modification, the server 10 may not store the scan flag in association with the device ID and the email address in the device table 38. In this case, when receiving an email including image data, the server 10 may generate print data representing an image including a barcode. Generally speaking, the determiner, the second generator, and the second print data transmission unit can be omitted.

In a fifth modification, in a case where the email at T10 in FIG. 3 includes, as an attached file, a specific file indicating that a barcode is to be printed, the server 10 may generate print data representing an image including a barcode. In a case where the email at T10 does not include the specific file, the server 10 may generate print data representing an image that does not include a barcode. In this case, the server 10 may not store the scan flag in association with the device ID and the email address in the device table 38. In this modification, the processing of determining whether the email includes the specific file is an example of the processing performed by a determiner. That the email includes the specific file is an example in which a "predetermined condition" is satisfied. In another modification, when a specific character string indicating that a barcode is to be printed is included in the text of the email at T10 in FIG. 3, the server 10 may generate print data representing an image including the barcode. When the specific character string is not included in the text of the email at T10, the server 10 may generate print data representing an image that does not include a barcode. In this case, the server 10 may not store the scan flag in association with the device ID and the email address in the device table 38. In this modification, the processing of determining whether the text of the email includes the specific character string is an example of processing performed by a determiner. That the text of the email includes the specific character string is an example in which a "predetermined condition" is satisfied.

In a sixth modification, at least one of the processes in FIGS. 2 to 8 performed using software (for example, the program 36) in each of the embodiments described above may be performed using hardware such as a logic circuit.

The technical elements described in this specification or the drawings each exhibit technical effects separately or in combination, and combinations of the elements are not limited to those described in the claims as filed. The techniques illustrated in the specification or the drawings may achieve a plurality of purposes at a time, and achieving one of the purposes may produce technical effects.

What is claimed is:

1. A server, comprising:
    memory;
    an email receiver configured to receive, from an external device, a first email including image data, a first email address as a destination address, and a second email address as a source address;
    a memory controller configured to store identification information in association with the second email address in the memory, the identification information identifying print data obtained using the image data included in the first email;
    a first generator configured to generate first print data representing a first print image, the first print image including a first partial image represented by the image data and a second partial image representing an image corresponding to the identification information;
    a first print data transmitter configured to transmit the first print data to a printer corresponding to the first email address;
    a scanned data receiver configured to receive scanned data from a scanner in response to the scanner scanning a printed material having the first print image output from the printer, the scanned data representing a scanned image including the first print image;
    an email transmitter configured to transmit a second email including the scanned data, the second email further including, as a destination address, the second email address associated with the identification information corresponding to the second partial image included in the scanned image; and
    a determiner configured to, in response to reception of the first email from the external device, determine whether a predetermined condition is met,
    wherein the first generator is configured to, in response to the determiner determining that the predetermined condition is met, generate the first print data representing the first print image including the first partial image and the second partial image,
    wherein the server further comprises a second generator and a second print data transmitter,
    wherein the second generator is configured to, in response to the determiner determining that the predetermined condition is not met, generate second print data representing a second print image, the second print image including the first partial image and not including the second partial image, and
    wherein the second print data transmitter is configured to transmit the second print data to the printer corresponding to the first email address.

2. The server according to claim 1, wherein the second email is not transmitted when the scanned data is received from the scanner after a lapse of a predetermined time since the identification information and the second email address were stored in the memory.

3. The server according to claim 1, wherein the second email is not transmitted when the scanned data is received again from the scanner after being received a predetermined number of times since the identification information and the second email address were stored in the memory.

4. The server according to claim 1, wherein the determiner is configured to:
    determine that the predetermined condition is met in response to the memory storing flag information in association with the first email address, the flag information indicating printing of the second partial image corresponding to the identification information; and
    determine that the predetermined condition is not met in response to the memory not storing the flag information in association with the first email address.

5. The server according to claim 1,
    wherein the printer has a first type email address and a second type email address different from the first email address,
    wherein the determiner is configured to:
    determine that the predetermined condition is met when the first email address included in the first email is the first type email address, and
    determine that the predetermined condition is not met when the first email address included in the first email is the second type email address.

6. The server according to claim 1,
    wherein the printer and the scanner are unified into a first multifunction peripheral,
    wherein, for the memory storing first option information in association with first device identification information identifying the first multifunction peripheral, the email transmitter is configured to transmit the second email in a first case where the scanned data is received from the first multifunction peripheral in response to the first multifunction peripheral scanning the printed material having the first print image output from the first multifunction peripheral,
    wherein, for the memory storing the first option information in association with the first device identification information, the email transmitter is configured to not transmit the second email in a second case where the scanned data is received from a different scanner other than the first multifunction peripheral in response to the different scanner scanning the printed material having the first print image output from the first multifunction peripheral, wherein, for the memory not storing the first option information in association with the first device identification information, the email transmitter is configured to transmit the second email in both of the first case and the second case.

7. The server according to claim 1,
wherein the printer and the scanner are unified into a second multifunction peripheral, wherein, for the memory storing second option information in association with second device identification information identifying the second multifunction peripheral, the email transmitter is configured to transmit the second email in a third case where the scanned data is received from the second multifunction peripheral in response to the second multifunction peripheral scanning the printed material having the first print image output from the second multifunction peripheral, wherein, for the memory storing the second option information in association with the second device identification information, the email transmitter is configured to not transmit the second email in a fourth case where the scanned data is received from the second multifunction peripheral in response to the second multifunction peripheral scanning the printed material having the first print image output from a printer different from the second multifunction peripheral, wherein, for the memory not storing the second option information in association with the second device identification information, the email transmitter is configured to transmit the second email in both of the third case and the fourth case.

8. A non-transitory computer readable storage medium storing a program for a server including memory and a computer, the program comprising instructions that, when executed, cause the computer to function as:

an email receiver configured to receive, from an external device, a first email including image data, a first email address as a destination address, and a second email address as a source address;

a memory controller configured to store identification information in association with the second email address in the memory, the identification information identifying print data obtained using the image data included in the first email;

a first generator configured to generate first print data representing a first print image, the first print image including a first partial image represented by the image data and a second partial image representing an image corresponding to the identification information;

a first print data transmitter configured to transmit the first print data to a printer corresponding to the first email address;

a scanned data receiver configured to receive scanned data from a scanner in response to the scanner scanning a printed material having the first print image output from the printer, the scanned data representing a scanned image including the first print image;

an email transmitter configured to transmit a second email including the scanned data, the second email further including, as a destination address, the second email address associated with the identification information corresponding to the second partial image included in the scanned image; and a determiner configured to, in response to reception of the first email from the external device, determine whether a predetermined condition is met, wherein the first generator is configured to, in response to the determiner determining that the predetermined condition is met, generate the first print data representing the first print image including the first partial image and the second partial image, wherein the server further comprises a second generator and a second print data transmitter, wherein the second generator is configured to, in response to the determiner determining that the predetermined condition is not met, generate second print data representing a second print image, the second print image including the first partial image and not including the second partial image, and wherein the second print data transmitter is configured to transmit the second print data to the printer corresponding to the first email address.

9. A server, comprising:
memory;

an email receiver configured to receive, from an external device, a first email including image data, a first email address as a destination address, and a second email address as a source address;

a memory controller configured to store identification information in association with the second email address in the memory, the identification information identifying print data obtained using the image data included in the first email;

a first generator configured to generate first print data representing a first print image, the first print image including a first partial image represented by the image data and a second partial image representing an image corresponding to the identification information;

a first print data transmitter configured to transmit the first print data to a printer corresponding to the first email address;

a scanned data receiver configured to receive scanned data from a scanner in response to the scanner scanning a printed material having the first print image output from the printer, the scanned data representing a scanned image including the first print image;

an email transmitter configured to transmit a second email including the scanned data in a predetermined case, the second email further including, as a destination address, the second email address associated with the identification information corresponding to the second partial image included in the scanned image; and a determiner configured to, in response to reception of the first email from the external device, determine whether a predetermined condition is met, wherein the first generator is configured to, in response to the determiner determining that the predetermined condition is met, generate the first print data representing the first print image including the first partial image and the second partial image, wherein the server further comprises a second generator and a second print data transmitter, wherein the second generator is configured to, in response to the determiner determining that the predetermined condition is not met, generate second print data representing a second print image, the second print image including the first partial image and not including the second partial image, and wherein the second print data transmitter is configured to transmit the second print data to the printer corresponding to the first email address.

10. The server according to claim 9, wherein the email transmitter is configured to transmit the second email in the predetermined case where a predetermined time has not elapsed since the identification information and the second email address were stored in the memory.

11. The server according to claim 9, wherein the email transmitter is configured to transmit the second email in the predetermined case where the scanned data has not received a predetermined number of times since the identification information and the second email address were stored in the memory.

12. The server according to claim 9, wherein the determiner is configured to:
   determine that the predetermined condition is met in response to the memory storing flag information in association with the first email address, the flag information indicating printing of the second partial image corresponding to the identification information; and
   determine that the predetermined condition is not met in response to the memory not storing the flag information in association with the first email address.

13. The server according to claim 9,
   wherein the printer has a first type email address and a second type email address different from the first email address,
   wherein the determiner is configured to:
      determine that the predetermined condition is met when the first email address included in the first email is the first type email address, and
      determine that the predetermined condition is not met when the first email address included in the first email is the second type email address.

14. The server according to claim 9,
   wherein the printer and the scanner are unified into a first multifunction peripheral,
   wherein, for the memory storing first option information in association with first device identification information identifying the first multifunction peripheral, the email transmitter is configured to transmit the second email in a first case where the scanned data is received from the first multifunction peripheral in response to the first multifunction peripheral scanning the printed material having the first print image output from the first multifunction peripheral,
   wherein, for the memory storing the first option information in association with the first device identification information, the email transmitter is configured to not transmit the second email in a second case where the scanned data is received from a different scanner other than the first multifunction peripheral in response to the different scanner scanning the printed material having the first print image output from the first multifunction peripheral,
   wherein, for the memory not storing the first option information in association with the first device identification information, the email transmitter is configured to transmit the second email in both of the first case and the second case.

15. The server according to claim 9,
   wherein the printer and the scanner are unified into a second multifunction peripheral,
   wherein, for the memory storing second option information in association with second device identification information identifying the second multifunction peripheral, the email transmitter is configured to transmit the second email in a third case where the scanned data is received from the second multifunction peripheral in response to the second multifunction peripheral scanning the printed material having the first print image output from the second multifunction peripheral,
   wherein, for the memory storing the second option information in association with the second device identification information, the email transmitter is configured to not transmit the second email in a fourth case where the scanned data is received from the second multifunction peripheral in response to the second multifunction peripheral scanning the printed material having the first print image output from a printer different from the second multifunction peripheral,
   wherein, for the memory not storing the second option information in association with the second device identification information, the email transmitter is configured to transmit the second email in both of the third case and the fourth case.

* * * * *